Dec. 27, 1966 J. S. LAGARIAS 3,294,236
METHOD FOR PNEUMATICALLY ELUTRIATING SOLID PARTICLES
Filed Jan. 28, 1965

INVENTOR
JOHN S. LAGARIAS
BY Herman L. Gordon
ATTORNEY 3,294,236
METHOD FOR PNEUMATICALLY ELUTRIATING SOLID PARTICLES
John S. Lagarias, Silver Spring, Md., assignor to American Instrument Company, Inc., Silver Spring, Md.
Filed Jan. 28, 1965, Ser. No. 428,693
1 Claim. (Cl. 209—139)

This invention relates to a method for separating or fractionating finely divided or powdered material, and more particularly to a multi-stage air elutriation method which separates dry finely-divided materials according to particle diameter and density.

A main object of the invention is to provide an improved multi-stage air elutriation method which, in a single operation, divides particles into a plurality of fractions having a substantially constant diameter differential, the apparatus for carrying out the method being simple in construction, being easy to operate, and providing highly reproducible results.

A further object of the invention is to provide an improved multi-stage air elutriation method which divides particles into a plurality of fractions having a substantially constant diameter differential by setting the air flow in accordance with the density of the material being fractionated.

A still further object of the invention is to provide an improved multi-stage air elutriation method in a multi-stage elutriator of the type comprising successive settling chambers in which separation of the particles takes place, the successive chambers being mutually related to each other in size so that with a given flow rate the respective separated fractions have a substantially constant nominal decrease in particle diameter.

Further objects and advantages of the invention will become apparent from the following description and claims, and from the accompanying drawings, wherein:

Figures 1, 2:
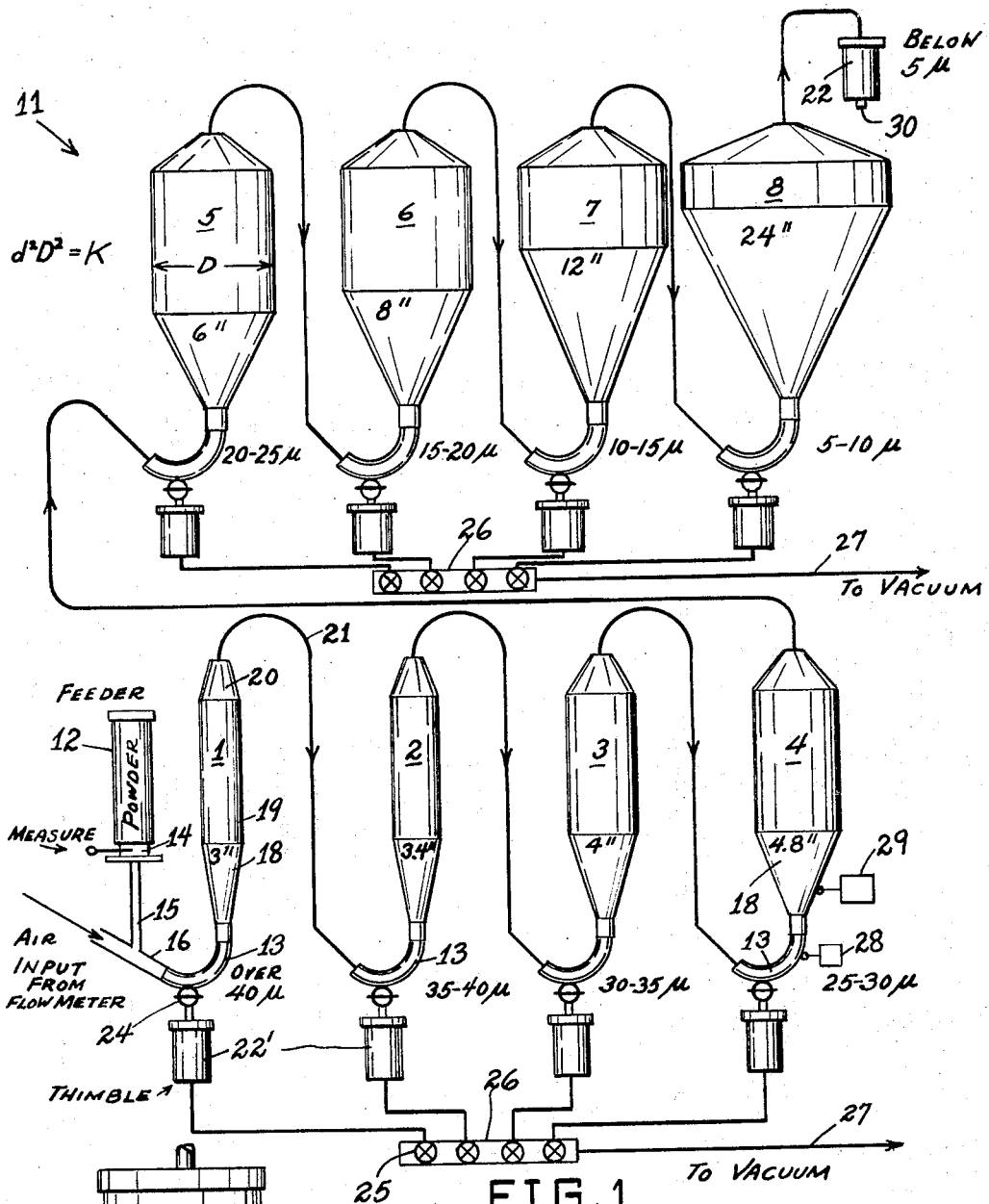
FIGURE 1 is a schematic diagram illustrating a cascade particle classifier system according to the present invention.
FIGURE 2 is an enlarged elevational view, partly in cross-section, showing one of the particle-collection thimbles employed in the system of FIGURE 1.

Referring to the drawings, in FIGURE 1, 11 generally designates a multi-stage air elutriator which separates dry, finely-divided materials according to particle diameter and density. The elutriator 11 is arranged to divide the particles into as many as nine fractions, whereby direct fractionation in selectively-sized groups can be obtained.

The elutriator 11 comprises a charging chamber 12 apapted to receive the material to be separated. A controlled volume of test material can be transferred to a first U-tube 13 through a conventional rotary charging valve 14 provided at the bottom of chamber 12, the test material descending through a conduit 15 toward an inclined conduit 16 connected at its lower end to one end of U-tube 13. A source of air, suitably regulated as to flow and pressure, is connected to the upper end of the inclined conduit 16. The air enters the U-tube 13 and impinges on the powdered sample, converting it into fine particles and entraining the particles in the air stream. The steady air stream carries particles of the powdered sample into a first settling chamber 1 mounted above and connected to the discharge end of the U-tube 13. As the airstream with its entrained particles enters the first settling chamber, it passes through a diffuser section 18, expanding in cross-sectional area to the diameter of the cylindrical actual settling region 19. In expanding, the air assumes a specific linear velocity. The force exerted by the airstream is great enough to carry all particles smaller than a specific diameter up through the settling chamber portion 19. Particles larger than this diameter fall back against the force of the airstream into the sample tube 13. The upper portion of the settling chamber decreases in cross-sectional area at the top, as shown at 20, so that the air velocity increases as the air and the small particles pass to the conduit 21 leading to the next separation stage. The airstream carries the particles out of the separating chamber through the transfer conduit 21 to the U-tube 13 associated with said next separation stage. The process is repeated in up to seven other settling chambers of successively increasing diameter, for example, the chambers 2 to 8 of FIGURE 1, thereby separating the material into finer fractions at each stage. At the final separation stage the air passes through a thimble 22 having a bottom outlet duct 30 and containing a porous paper collection cup 23 which overlies the entrance to said duct and retains the final fraction. A similar thimble 22' is provided for each U-tube 13, being connected to the lowermost portion of the U-tube through a stopcock 24. The bottom ends of the thimbles 22' are provided with outlet ducts 30' connected through respective control valves 25 to vacuum chambers 26 connected to vacuum lines 27. The porous paper cups 23 in the thimbles are porous enough to pass air while retaining the fractionated material deposited therein.

In a typical installation, the range of particles to be separated is from 1 to 74 microns (one micron equals one-thousandth of a millimeter).

The lower limit of particle separations is determined by the time required in making the separation. The time required to perform separations of particles having diameters less than a few microns becomes unreasonably long. The upper limit is established by the maximum air flow rate that can be measured by the system and the density of the material being separated. In the aforesaid typical installation a practical upper limit is a maximum diameter of about 74 microns. (This is the size of material passed by a 200-mesh sieve.)

Suitable tapping mechanisms 29, 28 may be employed at the expansion portions 18 of the settling chambers and at the U-tubes 13 to aid in the deflocculation action of the air flow and to dislodge particles from the walls of the settling chambers.

During operation, the stopcocks 24 are kept closed. These stopcocks are opened to remove the powder from the U-tubes after the main air flow is shut off. By opening the valves 25 the powder will be drawn into the thimbles 22' and will be deposited in the paper cups 23.

The powder may also be removed from the U-tubes by removing the U-tubes and dumping out the residue.

The apparatus 11 separates the particles into a succession of fractions having a substantially constant nominal diameter differential. This separation is based on Stoke's Law which states that the velocity V of a spherical particle falling freely in a viscous medium is expressed by the equation:

$$V = \frac{2}{9} \times \frac{gr^2(\rho - \rho_a)}{\theta} = \frac{gd^2(\rho - \rho_a)}{18\theta} \text{ cm./sec.} \quad (1)$$

where:
$d = 2r =$ diameter of the particle in cm.
$g =$ gravitational constant, 980 cm./sec.$^2$
$\theta =$ viscosity of the fluid medium, $1.82 \times 10^{-4}$ for air at 20° C.
$\rho =$ density of the particle in gm./cm.$^3$
$\rho_a =$ density of the fluid medium in gm./cm.$^3$ If the density of air is neglected, the particle diameter is expressed in microns, and if the above values are substituted in Equation 1, the complete term reduces to:

$$V = 29.91 \times 10^{-4} \ d^2 \rho \text{ cm./sec.} \quad (2)$$

The required air flow rate F can be obtained as the velocity multiplied by the cross-sectional area of the settling chamber:

$$F = \frac{V\pi D^2}{4} \text{ cm.}^3/\text{sec.} \quad (3)$$

which reduces to:

$$F = 0.785 V D^2 \text{ cm.}^3/\text{sec.} \quad (4)$$

where:

$D$ = the settling chamber diameter in cm.

Substituting the expression $V = 29.91 \times 10^{-4} d^2\rho$ cm./sec. into the equation for F above gives the following equation:

$$F = 0.1409 \times 10^{-3} \rho d^2 D^2 \text{ liters/min.} \quad (5)$$

According to the present invention, the chambers 1 to 8 are designed so that $d^2 D^2 = K$, or $D^2 = K/d^2$, where K is a constant. To obtain 5-micron cut fractions, $$K = 9.22 \times 10^4, \text{ and}$$
$$F = 13.0\rho \text{ liters/min.} \quad (6)$$

With this single relationship, the desired flow rate can be set, once the density is known, to obtain eight cuts, as shown, that nominally decrease by 5 microns each. Determining the size separation at any particular chamber automatically fixes the cuts that will be obtained at the other elutriation chambers.

For ease of operation, the determination is preferably made on the basis of a plus 5-micron fraction, or a plus 10-micron fraction.

For example, assume a density of 4.0 with a 5-micron cut to be made at chamber 8.

$$F = 0.1409 \times 10^{-3} \times 4 \times 5^2 \times D^2 \text{ (in cm.)}$$
$$D = 24 \times 2.54 = 60.96 \text{ cm.}$$

Substituting the value of D, F=52 liters/min.

This will give cuts of 5, 10, 15, 20, 25, 30, 35 and plus 40-microns at the eight chambers.

In the typical arrangement illustrated in FIGURE 1, which is in accordance with the theory of design given above, the eight settling chambers have diameters given by the following table:

| Chamber: | Diameter in inches |
|---|---|
| 1 | 3.0 |
| 2 | 3.4 |
| 3 | 4.0 |
| 4 | 4.8 |
| 5 | 6.0 |
| 6 | 8.0 |
| 7 | 12.0 |
| 8 | 24.0 |

The values in the above table are derived from the basic relationship $D^2 d^2 = K$, with a value of $9.22 \times 10^4$ for K and a 5-micron differential in particle diameters between successive settling chambers.

From the above relationship, it can be shown that $$\frac{1}{D_1} - \frac{1}{D_2} = \frac{d_1 - d_2}{\sqrt{k}} \quad (7)$$

where $D_1$ and $D_2$ are the diameters of successive chambers and $d_1 - d_2$ is the differential in particle diameters of the particles obtained in the successive chambers.

For the values of K and $d_1 - d_2$ given above, the value at the right side of Equation 7 is $1.65 \times 10^{-2}$, a constant, and thus the reciprocals of the diameters of successive chambers differ in value by a constant amount. The diameter of a chamber can be expressed in terms of the diameter of the following chamber, as follows:

$$D_1 \text{ (in cm.)} = \frac{1}{1.65 \times 10^{-2} + \frac{1}{D_2 \text{ (in cm.)}}}$$

According to this relationship, if chamber 8 is 24 inches, or 60.96 cm., the diameters of the respective chambers 1 to 8 will be given in cm. by the following table:

| Chamber: | D (in cm.) |
|---|---|
| 1 | 7.62 |
| 2 | 8.64 |
| 3 | 10.16 |
| 4 | 12.15 |
| 5 | 15.24 |
| 6 | 20.32 |
| 7 | 30.48 |
| 8 | 60.96 |

While a specific embodiment of the invention for separating finely divided material into fractions differing in nominal diameter by a constant value has been disclosed in the foregoing description, it will be understood that various modifications within the spirit of the invention may occur to those skilled in the art. Therefore it is intended that no limitations be placed on the invention except as defined by the scope of the appended claims.

What is claimed is:

A method of separating finely divided material into a plurality of fractions in a multi-stage apparatus of the type comprising a series of vertical elutriation chambers of increasing diameters wherein each chamber is provided at its bottom end with an inlet conduit, respective conduits connecting the top ends of the elutriation chambers to the inlet conduits of the next successive elutriation chambers, a collecting vessel connected to the top end of the last chamber for receiving the smallest fraction, and additional collecting vessels connected to the inlet conduits for receiving the intermediate fractions, the reciprocals of the diameters of the successive chambers differing by a substantially constant amount through the entire series of chambers, the steps of introducing compressed air into the inlet conduit associated with the smallest elutriation chamber, introducing the material to be fractionated into the last-named conduit, and regulating the air flow substantially in accordance with the expression $$F = 0.1409 \times 10^{-3} \rho d^2 D^2$$

where F is the air flow in liters per minute, $\rho$ is the density of the material, d is the diameter in microns of a particle to be separated in any chamber, and D is the diameter in centimeters of said last-named chamber.

References Cited by the Examiner

UNITED STATES PATENTS

| | | | |
|---|---|---|---|
| 2,019,507 | 11/1935 | Roller | 209—139 |
| 2,708,516 | 5/1955 | Matheson | 209—139 |
| 2,714,453 | 8/1955 | Miller | 209—142 |
| 2,717,536 | 9/1955 | Clark | 209—211 |

FRANK W. LUTTER, *Primary Examiner.*